Figure 1:
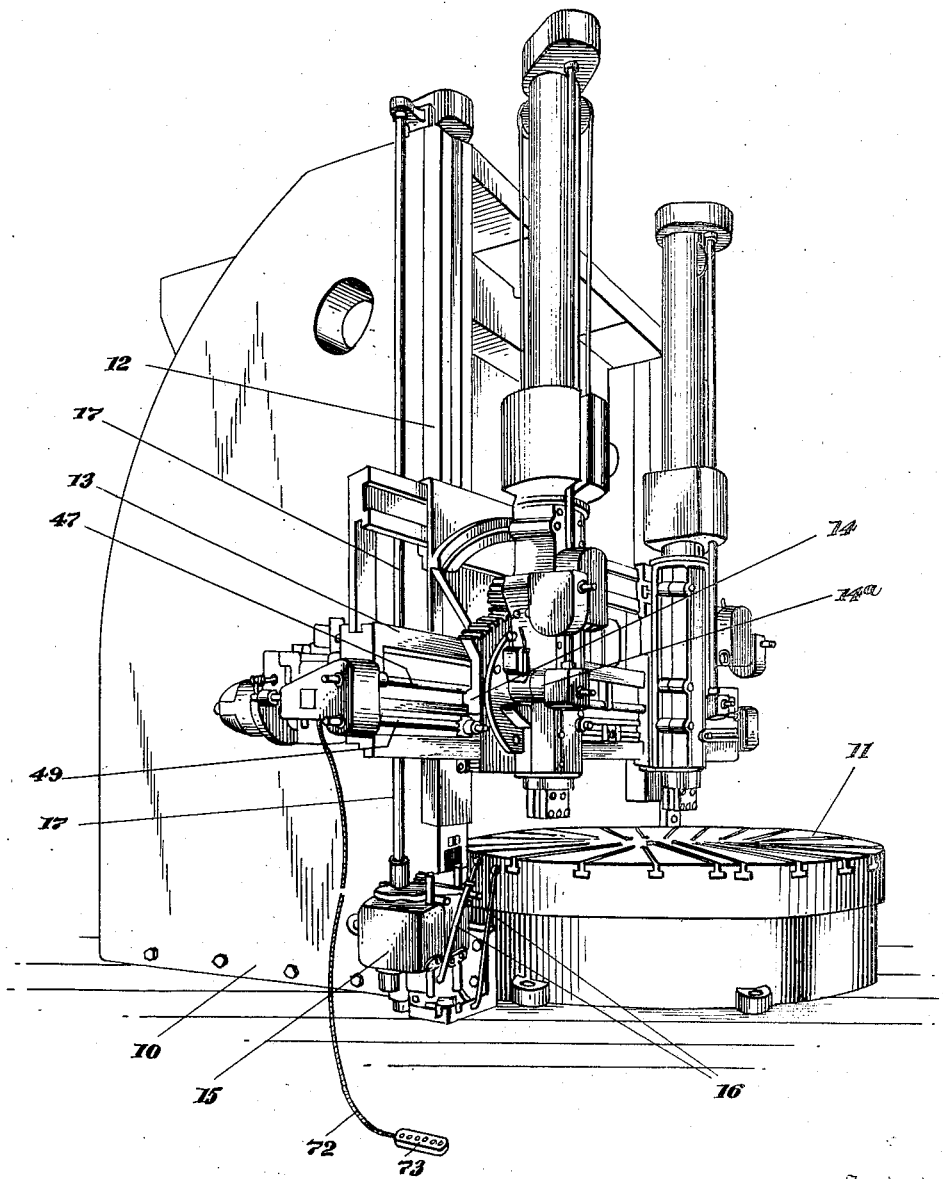

May 28, 1940. A. TROSCH 2,202,766
CONTROL MECHANISM FOR BORING MILLS AND THE LIKE
Filed Nov. 30, 1938 2 Sheets-Sheet 2

Inventor,
ALFRED TROSCH
By Clyde L. Rogers
his Attorney

Patented May 28, 1940

2,202,766

UNITED STATES PATENT OFFICE 2,202,766

CONTROL MECHANISM FOR BORING MILLS AND THE LIKE

Alfred Trosch, Rochester, N. Y., assignor to Consolidated Machine Tool Corporation, Rochester, N. Y., a corporation of New York Application November 30, 1938, Serial No. 243,263

2 Claims. (Cl. 77—4)

This invention relates to control mechanism for machine tools particularly of the larger heavy duty type and is herein illustratively shown as embodied in a vertical boring mill.

In heavy duty machine tools of this type where the work table is often as much as twelve feet in diameter, it becomes desirable to provide means whereby the operator from any position about the machine may be able to quickly and easily shift the driving connections so as to effect at will either a fast feed, as for roughing out, or slow feed as required for finishing work, or a rapid traverse to bring the tool or tools quickly to any required position, and to be able to apply such selective movements either to the vertical ram travel or to the horizontal head travel, at will. The prime object of the invention is to provide clutch controlling means capable of effecting these selective movements that are operated electrically or by a combination of electrical means with fluid motive power, the electric control, preferably embodying a portable panel or pendant equipped with the requisite contact buttons or the like and capable of being conveniently carried by the operator to any position about the machine for controlling the operative movements from such position. The foregoing and other objects and advantages of the invention will be better understood from the following detailed description taken in connection with the accompanying drawings and the distinctive features of novelty will be thereafter pointed out in the appended claims.

Figure 2:
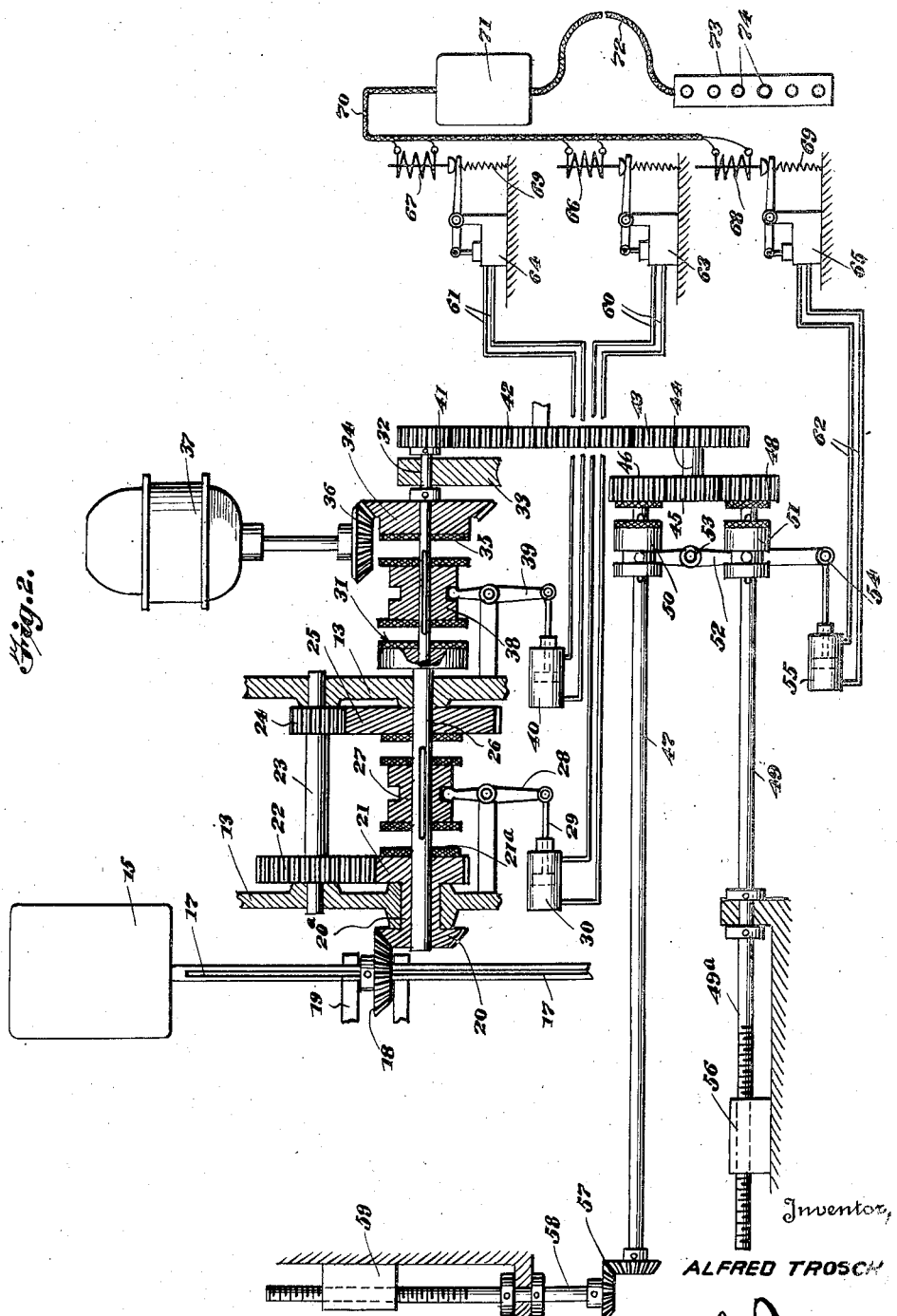

Referring to the drawings,

Figure 1 is a perspective view of a vertical boring machine equipped with the invention; and Figure 2 is a diagrammatic view partly in elevation and partly in section showing the gearing connections and the control therefor, with which the invention is concerned.

10 indicates the housing of a vertical boring mill equipped with a usual rotatable work table 11 and with vertical ways 12 on which the horizontal rail structure 13 is vertically adjustable. 14 denotes a tool carrying head horizontally movable on such rail structure and bearing a vertically movable ram or tool head 14a. Prime motive power for effecting the operative movements of the tools and the work table is derived from a motor, which may be located within the housing (and not shown), which transmits power to a gear box 15 adjacent the base of the housing, this gear box equipped with a system of selective change gears controlled by hand levers 16; the gear box forming no part of the present invention, is not herein further illustrated. The work table 11 is also rotated by connections (not shown) operative in timed relation with the rotation of a shaft 17 which extends upward from the gear box 15 and is suitably journaled in the housing and in the rail 13.

The shaft 17 has slidably keyed thereon a bevel pinion 18 and by suitable forks or abutments 19 borne by the rail 13 is caused to move vertically with the rail structure. This pinion meshes with a pinion 20 borne by a sleeve 20a journaled in a portion of the rail structure 13, this sleeve having fixed at its other end a spur pinion 21 meshing with a gear 22 fixed on a shaft 23. The shaft 23 which is journaled in the rail structure has fixed at its other end a pinion 24 meshing with a gear 25 which is loosely fitted on a shaft 26, having one end portion thereof journaled in a portion of the rail structure and having its other end portion extending through and journaled in the sleeve 20a. An intermediate portion of the shaft 26 has slidably keyed thereon a clutch hub 27 with opposite clutch faces adapted to engage selectively either a clutch face on the inner face of the gear 25 or a clutch face 21a on the inner side of the pinion 21. A shifting lever 28 engages a groove in the clutch hub 27 for shifting the same to either position and this lever is operated by a small piston or plunger 29 operative in a cylinder 30 and constituting part of the control system to be further described.

The inner end of the shaft 26 is formed with a head bearing a clutch face 31 and this shaft end is also bored to provide a bearing for one end of a shaft 32 the other end of which is mounted in a bearing bracket 33 of the rail structure. The shaft 32 has loosely fitted thereon a bevel gear 34 having a clutch face 35 on its inner side. This gear is in driven engagement with a pinion 36 fixed on the shaft of a small rapid traverse motor 37 also suitably mounted on the rail structure. A clutch hub 38 with opposite clutch faces is slidably keyed to the shaft 32 and adapted to engage selectively either the clutch face 31 of the shaft 26 or the clutch face 35 of the gear 34. For shifting the clutch hub 38 a lever 39 is provided, operated by a piston and cylinder assembly 40 similar to that which operates the clutch hub 27. The outer end of the shaft 32 has fixed thereon a pinion 41 which through an intermediate gear 42, drives a pinion 43 on a short shaft 44, which also has fixed thereon a pinion 45. The pinion 45 meshes with a pinion 46 loosely mounted on a shaft 47 and also meshes with and drives a pinion 48 loosely mounted at the end of a screw shaft 49. Both the pinions 46 and 48 have clutch faces at their inner sides engageable by clutch faces on clutch hubs 50 and 51 respectively, these clutch hubs being slidably keyed on the shafts 47 and 49 respectively and each engaged by an end of a lever 52 with an intermediate fulcrum 53 so that when either of these clutch hubs is engaged with the pinion co-operative therewith, the other is disengaged. These clutch hubs are engaged through a connection 54 with a piston and cylinder assembly 55. The threaded portion 49a of the shaft 49 is engaged with a nut 56 borne by the horizontal tool head 14, and thus adapted to impart horizontal travel thereto, while the end of the shaft 47 is connected through bevel gears 57 with a screw shaft 58 engaging a nut 59 connected with the vertical ram and adapted to impart travel thereto.

It may now be understood that with the described connections a slow feed is provided by moving the clutch hub 27 to the right and the clutch head 38 to the left, the drive being then through the speed reducing gears 22, 24. A fast feed is provided by moving the clutch head 27 to the left and the clutch head 38 to the left so that the drive is direct from the shaft 21 to the shaft 32; in each of these cases the rapid traverse connection is disengaged. For rapid traverse movement it is immaterial where the clutch head 27 may be, but the clutch head 38 is moved to the right so that the drive is from the rapid traverse motor 37 through the clutch face 35 to the shaft 32. The described slow, and fast feeds and rapid traverse may be selectively imparted to either the screw shaft 49 for providing travel of the horizontal head by moving the clutch head 51 into operative engagement, or it may be imparted to the screw shaft 58 for imparting movement to the vertical ram for either the slow or fast feed working movements or for the rapid traverse.

In accordance with my invention, as herein illustratively shown, the cylinder and piston assemblies 30, 40 and 55 are operated directly by compressed air or other pressure fluid and for this purpose lead lines 60, 61 and 62 lead from said cylinders respectively, to air valve devices 63, 64, 65 which are adapted to direct fluid pressure into either end of said cylinders at will. These air valve devices are respectively controlled by solenoids 66, 67, 68, with springs 69 reacting in opposition to said solenoids so that by energization or de-energization of said solenoids, the air valves may be positioned to admit pressure fluid to either end of any cylinder and exhaust it from the other end of such cylinder. Connections from said solenoids are combined into a cable 70 leading to an electrical conduit box 71, from which leads a cable 72 of sufficient length to permit a portable panel or block 73 at its end to be carried by the operator around any part of the work table. This panel bears a series of contact buttons or the like 74, by the selective operation of which it is possible to operate any one of the solenoids 66, 67, 68 in either direction, and thus to position the respective clutch heads 27, 38, 50 and 51 in the required position for the desired movement.

The entire machine is thus under the easy and convenient control of the operator, for all its operative movements from any place around the work table where he may be, the panel which bears the push button controls being of a small enough dimension so that it may be easily carried about. While the electric control is herein illustratively shown as applied through the medium of fluid pressure operated devices, it is to be understood that the invention in a broader aspect is not limited in this respect but that within the contemplation of the invention the shifting of the clutch hubs as described for the several selective movements may be accompanied directly by electrical means. In this, and other respects the present embodiment is to be understood as illustrative and not restrictive, reference being had to the appended claims rather than to the foregoing description to indicate the scope of the invention.

Having now described my invention what I claim as new, and desire to secure by Letters Patent is:

1. A vertical boring mill or the like comprising a vertically movable ram, a horizontally movable head on which the ram is mounted, change speed connections for operating said ram and head, a separate rapid traverse connection for also operating the same, clutch devices for selectively operating either the head or the ram and at a selective rate of speed, and electrically controlled means for operating said clutch devices embodying a portable contact panel equipped with manual means for controlling all of said clutch devices to effect a desired speed or a rapid traverse of either the horizontal head or the vertical ram at will, and also embodying a series of solenoids connected with the panel with a fluid control valve operated by each solenoid, and with fluid pressure cylinders connected to operate the respective clutch device and with said cylinders each connected to one of said fluid control valves.

2. A machine tool having a plurality of movable operative elements with change speed connections for moving said elements, and a rapid traverse connection for also moving said elements, clutch devices interposed in each of said connections, a fluid pressure cylinder and piston for each clutch device, a fluid control valve connected to each of said cylinders, and electrical means for operating each of said fluid control valves embracing a single operating station from which all of said electrical means may be manually controlled.

ALFRED TROSCH.